United States Patent Office.

GEORGE BIRKS, OF MARINE, ILLINOIS.

Letters Patent No. 100,358, dated March 1, 1870.

IMPROVED COMPOUND FOR PREVENTING INCRUSTATION IN STEAM-BOILERS.

The Schedule referred to in these Letters Patent and making part of the same

*To all whom it may concern:*

Be it known that I, GEORGE BIRKS, of Marine, in the county of Madison, and State of Illinois, have made a certain new and useful improved Anti-Incrustation Compound or Powder for removing the scales or other incrustation substances from boilers or tanks, pipes, or similar vessels in which water or similar fluids are subjected to great heat, and for preventing the formation of such scales or incrusted matter; and I do hereby declare the following to be a full and true description thereof and of the manner of applying the same.

I use of lamp-black, such as is merchantable, one pound avoirdupois to every three pounds avoirdupois of pulverized sawdust. I prefer sawdust from oak trees, but sawings from other trees are also usable.

To avoid loss in mixing, by the powdered lamp-black and sawdust being scattered by wind or by the work of mixing, it will be well to moisten the mixture slightly.

The parts being well intermixed, add half a pound avoirdupois of powdered bark of slippery elm and half a pound of powdered merchantable sulphur, and then all the parts thus named will be well stirred and mingled to a homogeneous mass.

Of the powder or mixture so prepared, a handful, or say three or four ounces, will be used each morning or evening, being thrown into the boiler or tank, the quantity being varied to suit the nature of the water, and especially its amount of lime and earthy matter carried in solution or suspension.

The action of my said mixture is effective to prevent or cleanse from scales, and it moreover is in no way deleterious to corrode the metal of the boiler or tank, and in nowise causes foaming of the water, which in the use of many anti-incrustation compounds is found so offensive if not disastrous.

Having thus fully described my invention,

What I claim, and desire to secure the use of by Letters Patent, is—

A chemical compound for removing incrustations or scales on steam-boilers, &c., which compound is composed of the ingredients mentioned in the foregoing specification, united or mixed together in the proportions specified or their equivalents In testimony of said invention, I have hereunto set my hand in presence of—

GEORGE X BIRKS.
his mark.

Witnesses:
ROBERT BURNS,
GEO. P. HERTHEL, Jr.